(12) United States Patent
Draughn et al.

(10) Patent No.: US 12,476,411 B2
(45) Date of Patent: Nov. 18, 2025

(54) SELF-LOCKING THREAD SYSTEMS AND CONNECTORS INCLUDING SAME

(71) Applicants: TE Connectivity Solutions GmbH, Schaffhausen (CH); TE Connectivity Nederland BV, AR 's-Hertogenbosch (NL)

(72) Inventors: Austin Draughn, Garner, NC (US); Freddy Jean Philip Dendas, Genk (BE)

(73) Assignee: TE CONNECTIVITY SOLUTIONS GmbH et al., Schaffhausen (CH)

( * ) Notice: Subject to any disclaimer, the term of this patent is extended or adjusted under 35 U.S.C. 154(b) by 594 days.

(21) Appl. No.: 17/852,224

(22) Filed: Jun. 28, 2022

(65) Prior Publication Data
US 2023/0420881 A1 Dec. 28, 2023

(51) Int. Cl.
*F16B 39/28* (2006.01)
*H01R 13/512* (2006.01)

(52) U.S. Cl.
CPC .................................. *H01R 13/512* (2013.01)

(58) Field of Classification Search
CPC .................................................... F16B 39/284
USPC ................ 411/264, 277, 280–281, 305, 282
See application file for complete search history.

(56) References Cited

U.S. PATENT DOCUMENTS

| | | | | |
|---|---|---|---|---|
| 1,064,546 A | * | 6/1913 | Ryan | F16B 39/30 411/929 |
| 2,414,870 A | * | 1/1947 | Harding | F16B 39/284 411/301 |
| 2,637,361 A | * | 5/1953 | Nagel | F16B 39/284 411/929 |
| 2,856,617 A | * | 10/1958 | Widmann | F16B 35/005 72/368 |
| 4,150,845 A | * | 4/1979 | Riuli | F16L 47/04 285/388 |
| 6,004,167 A | * | 12/1999 | Hirakawa | H01R 4/302 411/416 |
| 9,624,962 B2 | * | 4/2017 | Unseld | F16B 37/00 |
| 10,107,318 B2 | * | 10/2018 | Erpenbeck | F16B 37/043 |

OTHER PUBLICATIONS

"Amphenol Industrial H4 UTX PV Cable Connectors" Amphenol Industrial, Retrieved Date: Aug. 4, 2022, From URL: https://www.mouser.com/new/amphenol/amphenol-H4-UTX/ (4 pages).
H4 UTX PV Cable Connector Datasheet, Amphenol Corporation (2 pages) (Dec. 9, 2014).
T4 Pv Connector Installation Manual, TLIAN (Changshu) Co., Ltd. (9 pages) (Apr. 2020).
T4-PC-1 Connector Datasheet, TLIAN (Changshu) Co., Ltd. (2 pages) (Nov. 2016).

* cited by examiner

*Primary Examiner* — Flemming Saether

(57) ABSTRACT

A self-locking thread system includes a first threaded member and a second threaded member. The first threaded member includes a first thread. The second threaded member includes a second thread configured to be threaded with the first thread. The first thread has a first thread axis. The first thread includes a locking thread section that is non-circular in a transverse cross-sectional plane perpendicular to the first thread axis.

16 Claims, 16 Drawing Sheets

SELF-LOCKING THREAD SYSTEMS AND CONNECTORS INCLUDING SAME

FIELD

The present invention relates to thread locking systems and, more particularly, to self-locking thread systems.

BACKGROUND

Thread locking features or mechanisms may be used to secure a nut or the like to another component. For example, it is known to use a nut to secure a cable to a connector housing and to provide a thread locking feature to secure the nut in place. Some products use a locking feature that works like a ratchet, having a pawl on the connector housing and teeth on the nut. Such ratcheting mechanisms may only provide a locking effect in one direction and only with fixed/limited intervals. After heat cycling and product use, a cable jacket seal of the connector may relax and cause the nut to feel loose.

SUMMARY

According to some embodiments, a self-locking thread system includes a first threaded member and a second threaded member. The first threaded member includes a first thread. The second threaded member includes a second thread configured to be threaded with the first thread. The first thread has a first thread axis. The first thread includes a locking thread section that is non-circular in a transverse cross-sectional plane perpendicular to the first thread axis.

According to some embodiments, the locking thread section is oval in the transverse cross-sectional plane perpendicular to the first thread axis.

According to some embodiments, the locking thread section is elliptical in the transverse cross-sectional plane perpendicular to the first thread axis.

According to some embodiments, the first thread has a leading end and an opposing trailing end, a first pitch diameter of the locking thread section expands outwardly in a direction from the leading end to the trailing end in a first axial cross-sectional plane parallel to the first thread axis, and a second pitch diameter of the locking thread section tapers inwardly in the direction from the leading end to the trailing end in a second axial cross-sectional plane parallel to the first thread axis and perpendicular to the first axial cross-sectional plane.

In some embodiments, the second pitch diameter of the locking thread section tapers inwardly in the direction from the leading end to the trailing end at an angle of at least 3 degrees.

In some embodiments, the maximum first pitch diameter is at least 7 percent greater than the second pitch diameter at the same axial location.

In some embodiments, the circumference of the locking thread section is substantially uniform.

In some embodiments, the first thread further includes a lead thread section that is substantially circular cylindrical, and the circumference of the lead thread section is substantially the same as the circumference of the locking thread section.

According to some embodiments, the first thread further includes a lead thread section that is substantially circular cylindrical.

According to some embodiments, the first thread is a continuous helical thread.

In some embodiments, the locking thread section includes at least 3 thread turns.

According to some embodiments, the second thread is substantially circular cylindrical.

According to some embodiments, the second threaded member is formed of a deformable polymer.

In some embodiments, the first thread is an external thread and the second thread is an internal thread.

According to some embodiments, the first threaded member is a connector housing and the second threaded member is a cable retention nut.

According to some embodiments, an electrical connector includes a connector housing, an electrical contact in the connector housing, and a cable retention nut. The connector housing includes a first thread. The cable retention nut includes a second thread configured to be threaded with the first thread. The first thread has a first thread axis. The first thread includes a locking thread section that is non-circular in a transverse cross-sectional plane perpendicular to the first thread axis.

In some embodiments, the cable retention nut is operable to secure a cable to the connector housing.

According to some embodiments, the first thread has a leading end and an opposing trailing end, a first pitch diameter of the locking thread section expands outwardly in a direction from the leading end to the trailing end in a first axial cross-sectional plane parallel to the first thread axis, and a second pitch diameter of the locking thread section tapers inwardly in the direction from the leading end to the trailing end in a second axial cross-sectional plane parallel to the first thread axis and perpendicular to the first axial cross-sectional plane.

In some embodiments, the circumference of the locking thread section is substantially uniform.

In some embodiments, the first thread further includes a lead thread section that is substantially circular cylindrical, and the circumference of the lead thread section is substantially the same as the circumference of the locking thread section.

BRIEF DESCRIPTION OF THE DRAWINGS

The accompanying drawings, which form a part of the specification, illustrate embodiments of the technology.

DETAILED DESCRIPTION

Figure 1:
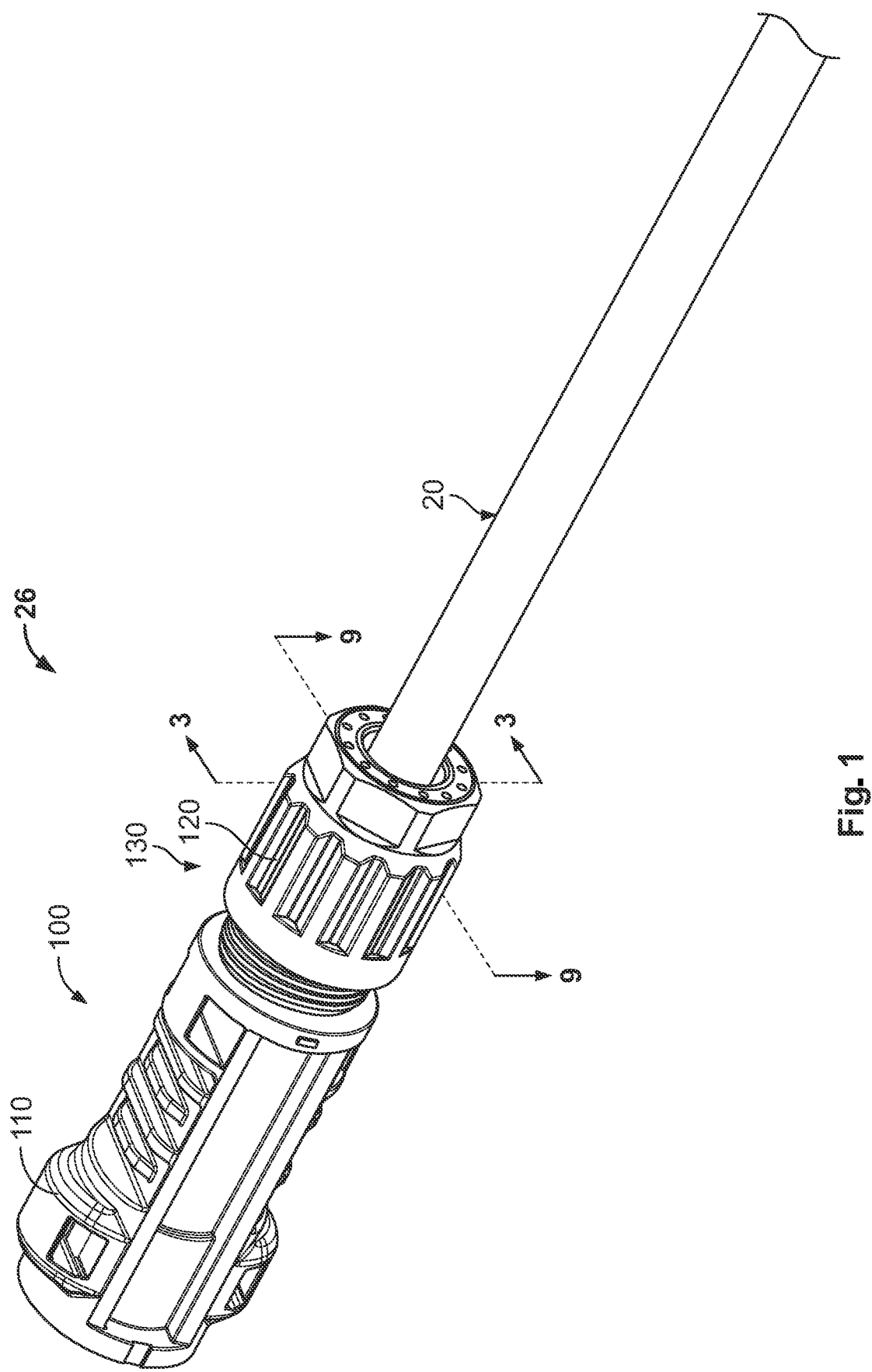
FIG. 1 is a perspective view of a terminated cable including a connector and a self-locking thread system according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

As used herein, "monolithic" means an object that is a single, unitary piece formed or composed of a material without joints or seams.

Figure 2:
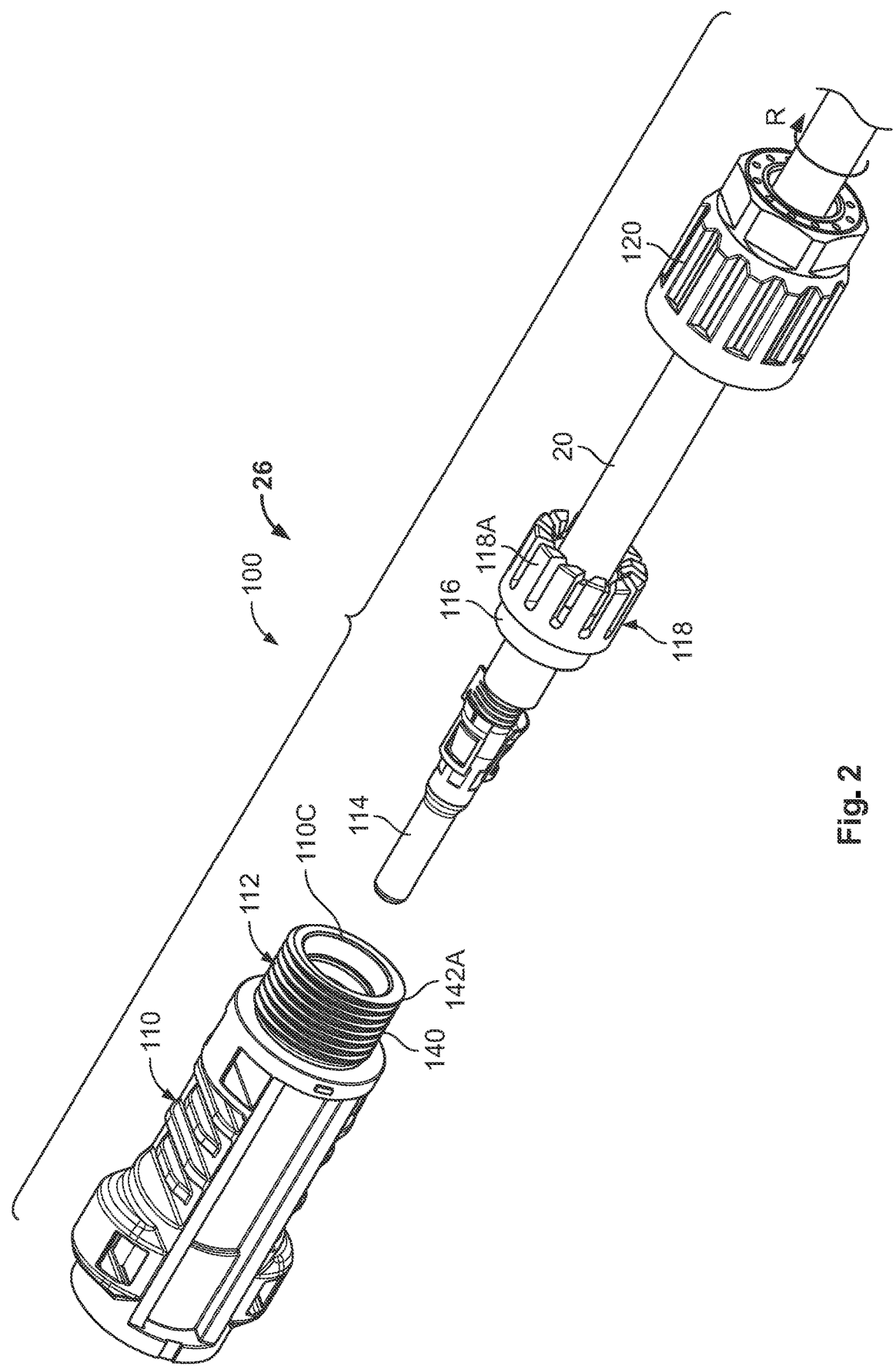
FIG. 2 is an exploded, perspective view of the terminated cable of FIG. 1.
Figure 3:
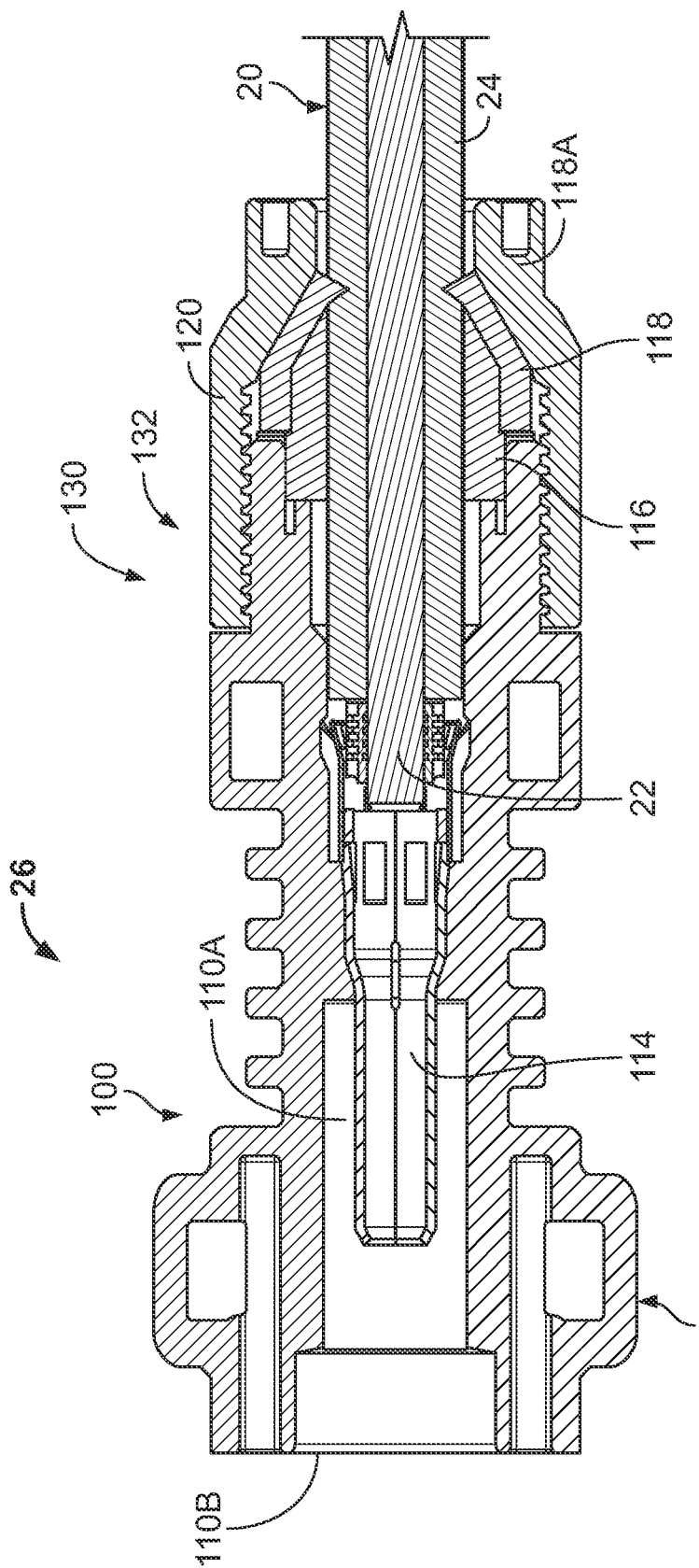
FIG. 3 is a cross-sectional view of the terminated cable of FIG. 1 taken along the line 3-3 of FIG. 1.
Figure 4:
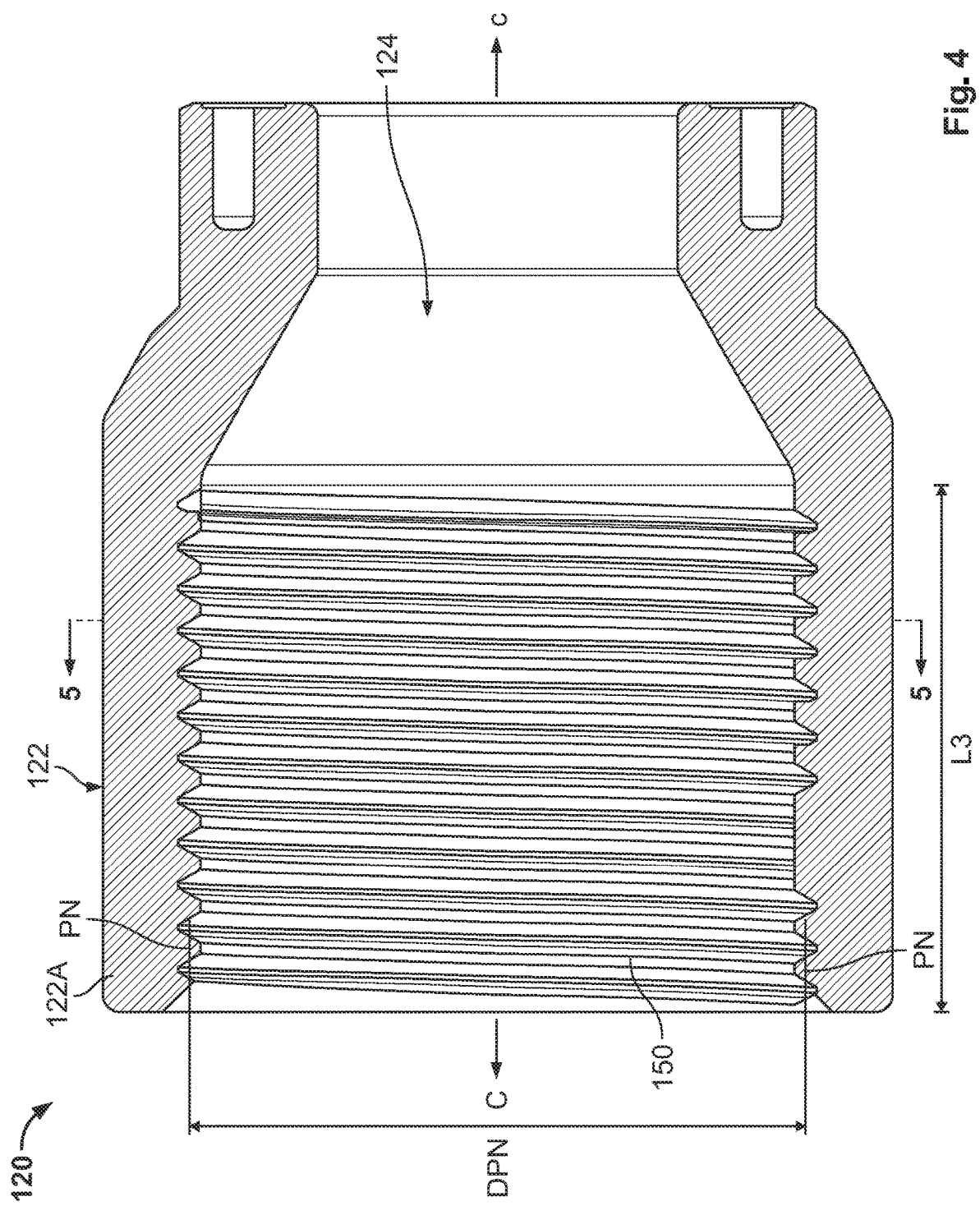
FIG. 4 is a cross-sectional view of a retention nut forming a part of the terminated cable of FIG. 1.

With reference to FIGS. 1-16, a self-locking thread system 130 according to some embodiments is shown therein. The illustrated self-locking thread system 130 forms a part of an electrical connector 100 according to some embodiments. The electrical connector 100 can be mounted on an electrical cable 20 to collectively form a terminated cable 26 (FIGS. 1-3). The cable 20 may include an electrical conductor 22 surrounded by an insulation jacket 24. The self-locking thread system 130 is used to secure the connector 100 to the cable 20 and/or to provide strain relief or environmental sealing between the connector 100 and the cable 20.

The connector 100 includes a connector housing 110, an electrical contact 114, a grommet 116, a pinch ring 118, and a retention nut 120. For the purpose of discussion, only the connector housing 110 and the retention nut are shown in FIGS. 4-16.

The connector housing 110 includes a cavity 110A, a front opening 110B, a rear opening 110C, and an integral collar, shank or post 112. An external (male), helical screw thread 140 (referred to herein as the post thread 140) is located or disposed (formed, secured or defined) on the outer surface of the post 112.

The grommet 116 may be of any suitable construction. The illustrated grommet 116 is a tubular sleeve. The grommet 116 may be formed of a resilient material. For example, the grommet 116 may be formed of an elastomer.

The pinch ring 118 is configured to clamp onto the cable 20 and/or press another component (e.g., the grommet 116) against the cable 20. The pinch ring 118 may be of any suitable construction. The illustrated pinch ring 118 is a tubular sleeve having integral, deflectable clamping fingers 118A. The pinch ring 118 may be formed of a resilient material. For example, the pinch ring 118 may be formed of spring steel.

The retention nut 120 includes a tubular body 122 defining an axial through passage 124 and including a tubular sidewall 122A. An internal (female) helical screw thread 150 (referred to herein as the nut thread 150) is located or disposed (formed, secured, or defined) on the inner surface of the sidewall 122A.

The self-locking thread system 130 includes the post 112 (as a first threaded member), the post thread 140 (as a first thread), the nut 120 (as a second threaded member), and the nut thread 150 (as a second thread). The self-locking thread system 130 includes an integral locking mechanism 132 provided by the cooperating configurations of the post thread 140 and the nut thread 150.

The post thread 140 has a first (central) thread axis B-B. The post thread 140 extends axially from a leading end 142A to a trailing end 142B. The post thread 140 includes a lead thread section 144 and a locking thread section 146. The lead thread section 144 extends from the leading end 142A to an opposing transition end 143, and the locking thread section 146 extends from the transition end 143 to the trailing end 142B.

Figure 8:
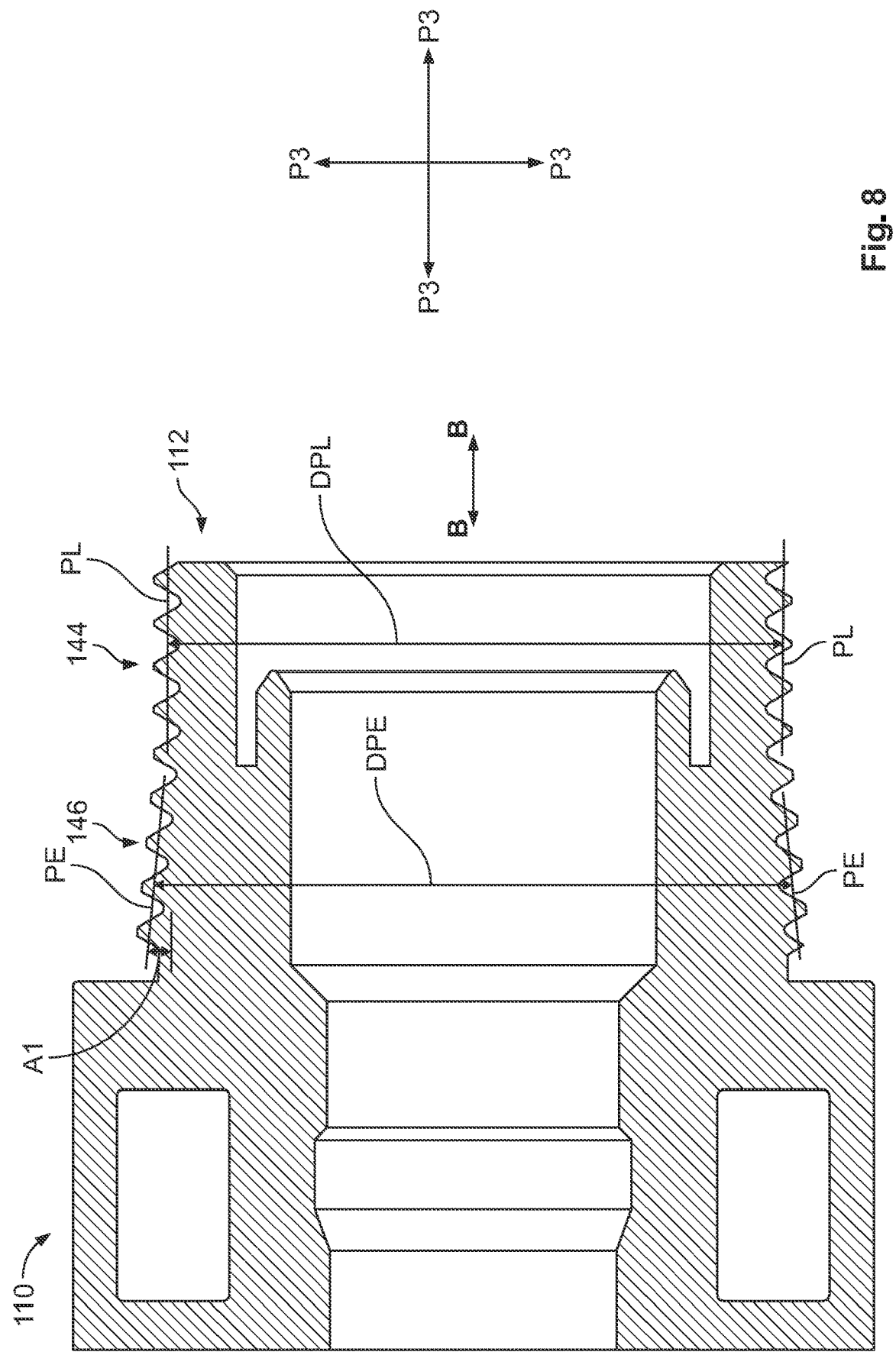
FIG. 8 is a fragmentary, cross-sectional view of the connector housing of FIG. 6 taken along the line 3-3 of FIG. 1.
Figure 9:
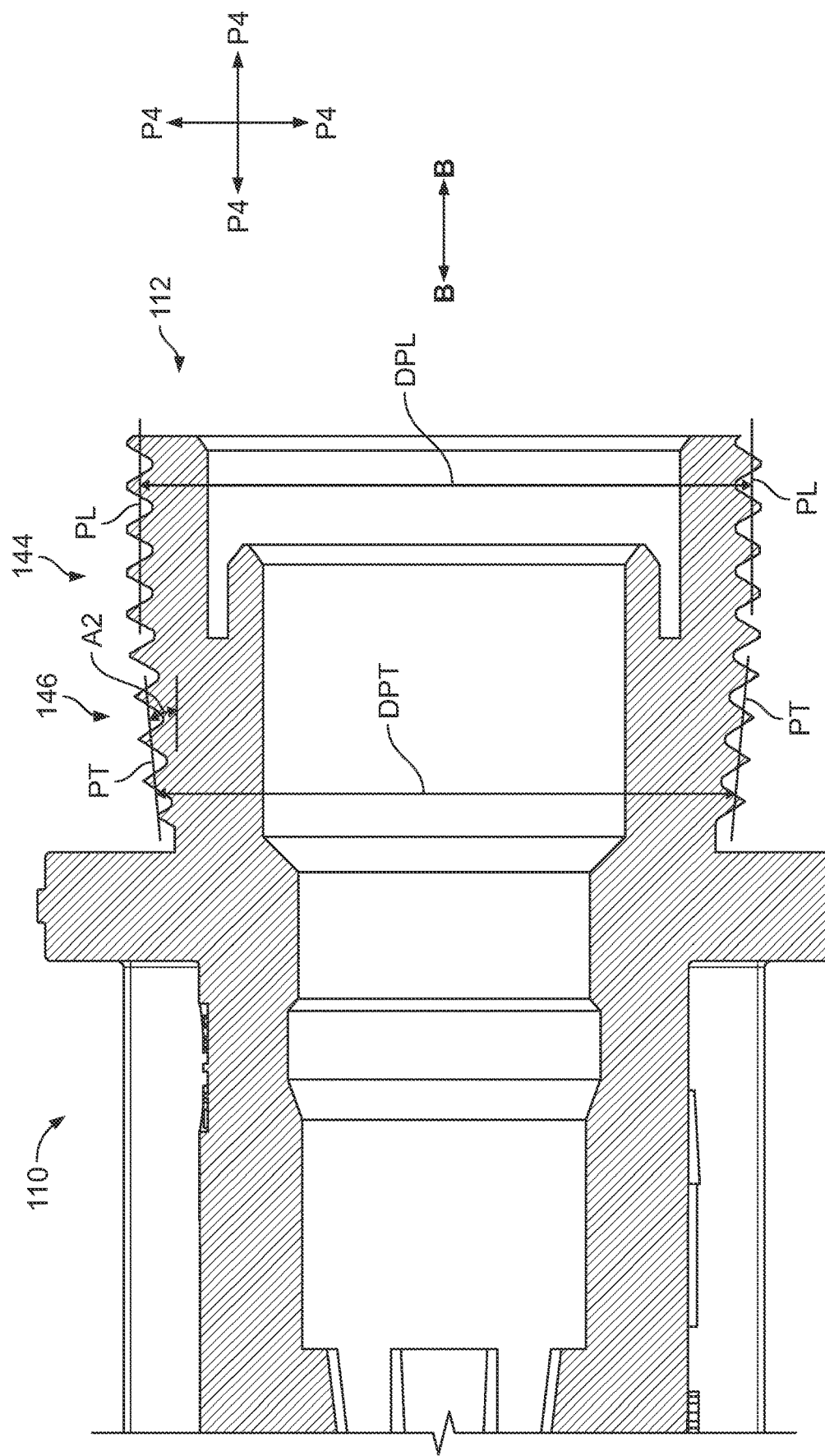
FIG. 9 is a fragmentary, cross-sectional view of the connector housing of FIG. 6 taken along the line 9-9 of FIG. 1.
Figure 10:
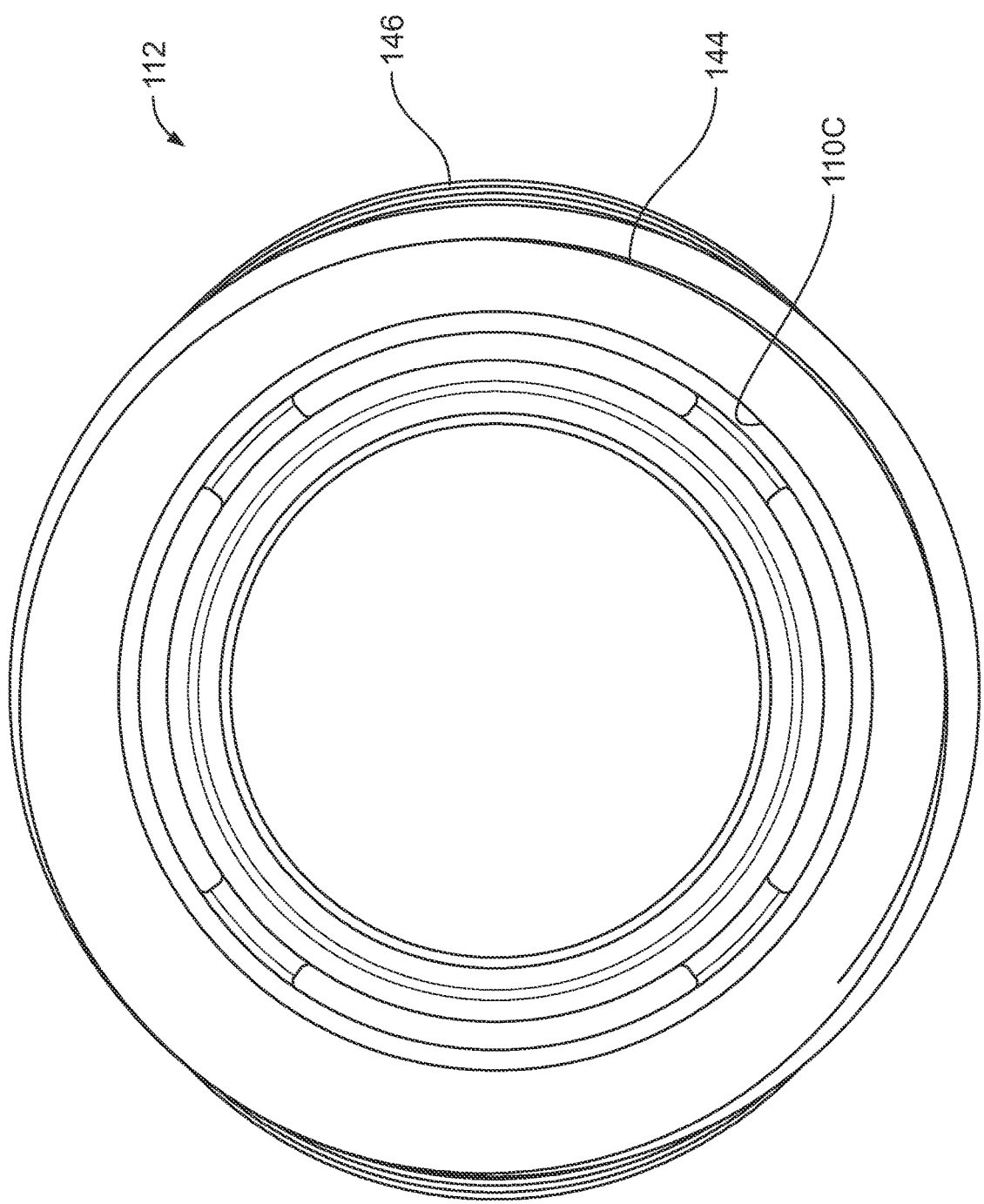
FIG. 10 is an end view of the connector housing of FIG. 6.
Figure 11:
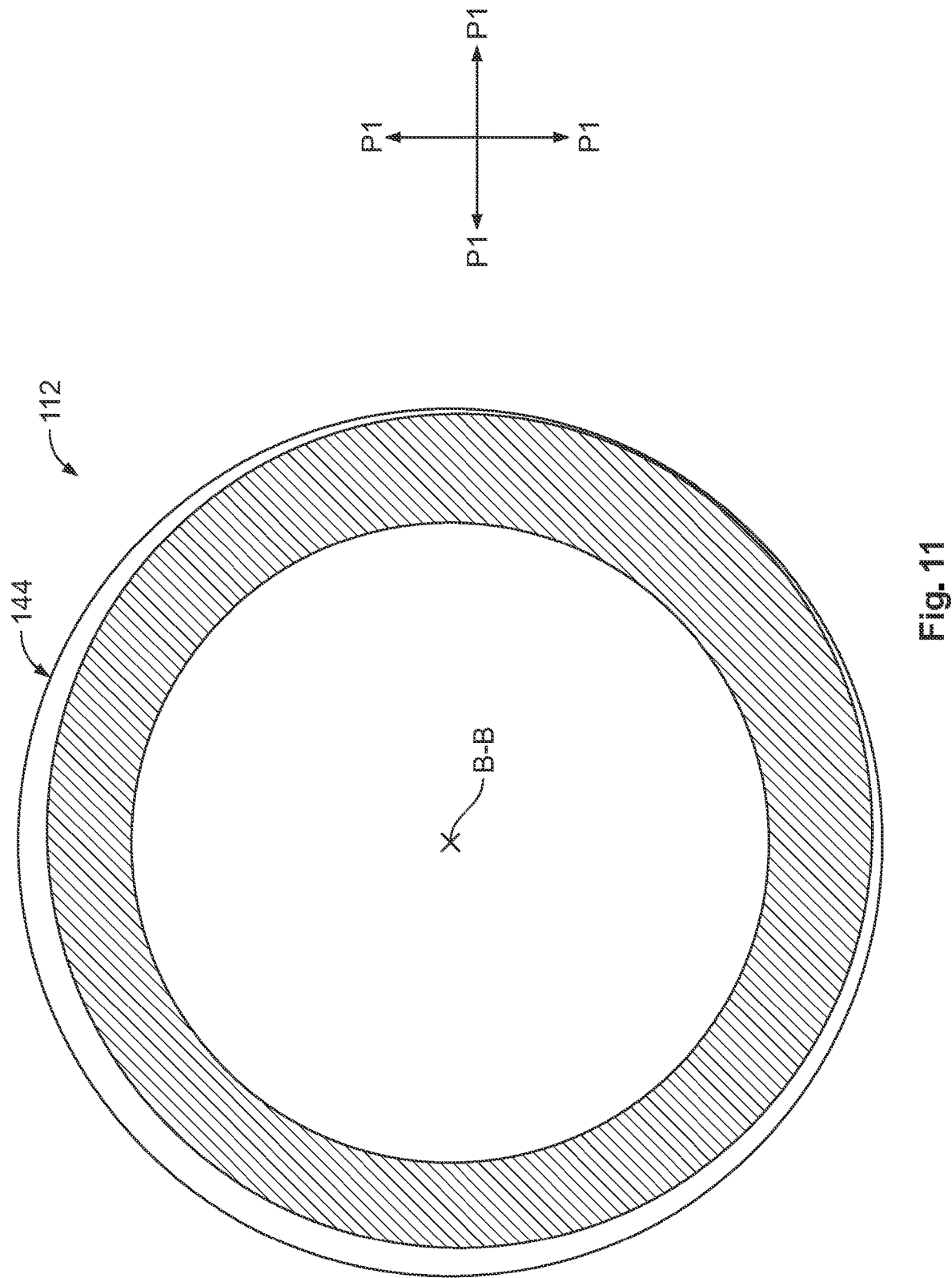
FIG. 11 is a fragmentary, cross-sectional view of the connector housing of FIG. 6 taken along the line 11-11 of FIG. 6.

The lead thread section 144 is substantially right circular cylindrical in shape and includes a continuous, helically wound series of circular thread turns 144E. Accordingly, and as shown in FIG. 11, the post thread 140 in the lead thread section 144 has a circular shape or profile in a transverse cross-sectional plane P1 that is perpendicular to the thread axis B-B. The pitch diameter DPL (spanning the pitch lines PL; FIGS. 8 and 9) is therefore substantially uniform from end 142A to end 143.

According to some embodiments, the axial length L1 (FIG. 7) of the lead thread section 144 is at least 2 mm and, in some embodiments, is in the range of from about 2 mm to 5 mm. According to some embodiments, the lead thread section 144 includes at least 2 thread turns 144E and, in some embodiments, in the range of from about 2 to 5 thread turns 144E.

The locking thread section 146 has a nonuniform shape or profile. Generally, the locking thread section 146 axially transitions from the circular cross-sectional shape of the lead thread section 144 at the transition end 143 to a non-circular shape at the end 142B. In some embodiments, the non-circular shape is an oblong or non-circular oval. In some embodiments, the non-circular shape is an ellipse (i.e., an oval having 180 degree rotational symmetry). The locking thread section 146 includes a continuous, helically wound series of non-circular (e.g., oblong, non-circular oval, or elliptical) locking threads 146E.

Figure 12:
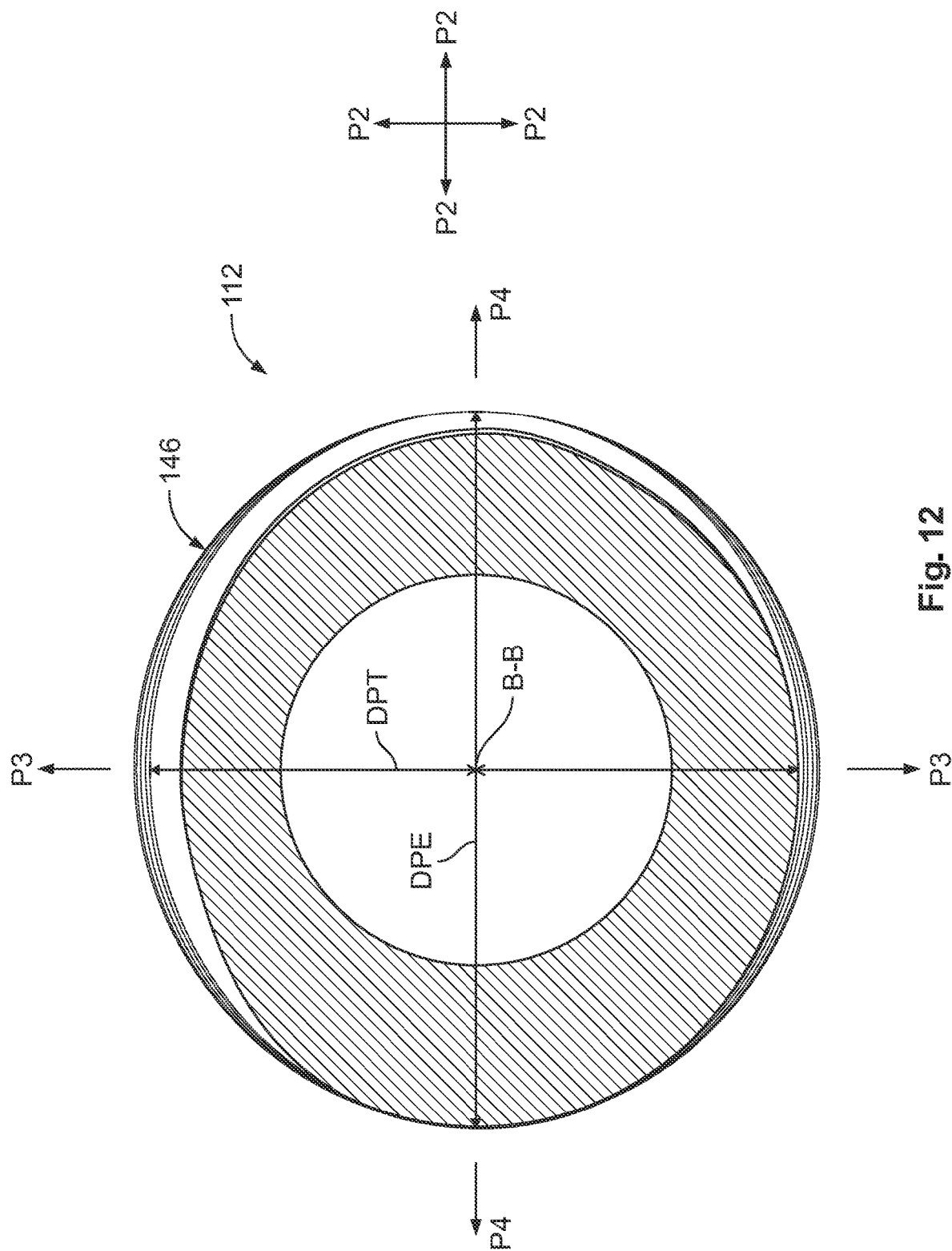
FIG. 12 is a fragmentary, cross-sectional view of the connector housing of FIG. 6 taken along the line 12-12 of FIG. 6.

More particularly and with reference to FIG. 12, the illustrated locking thread section 146 has as elliptical shape in a second transverse cross-sectional plane P2 that is perpendicular to the thread axis B-B. The plane P2 is axially spaced apart from the plane P1 between the lead thread section 144 and the trailing end 142B.

Moreover, the shape of the locking thread section 146 becomes progressively or increasingly more oblong or elliptical as the locking thread section 146 progresses in a direction ET (FIG. 6) from the leading end 142A toward the trailing end 142B. As a result, and with reference to FIGS. 8 and 9, the pitch diameter DPE (spanning the pitch lines PE; FIG. 8) of the locking thread section 146 expands radially outwardly in the direction ET in a first axial cross-sectional plane P3, and the pitch diameter DPT (spanning the pitch lines PT; FIG. 9) of the locking thread section 146 tapers inwardly in the direction ET in a second axial cross-sectional plane P4. The first axial cross-sectional plane P3 is parallel to the thread axis B-B. The second axial cross-sectional plane P4 is parallel to the thread axis B-B and perpendicular to the plane P3 (see, e.g., FIGS. 8, 9 and 12). In some embodiments, the shape of the locking thread section 146 transitions smoothly from the circular shape at the transition end 143 to the maximum elliptical shape at the end 142B.

In some embodiments, each pitch line PE expands at a widening angle A1 (FIG. 8) of at least 3 degrees and, in some embodiments, in the range of from about 3 degrees to 10 degrees. In some embodiments, each pitch line PT tapers at a tapering angle A2 (FIG. 9) of at least 3 degrees and, in some embodiments, in the range of from about 3 degrees to 10 degrees.

In some embodiments, the circumference of the post thread 140 is uniform throughout the locking thread section 146. That is, the circumference of the post thread 140 as defined by the pitch line of the post thread 140 is the same at each axial location along the length of the locking thread section 146. In some embodiments, as the post thread 140 expands radially along the major axis of the ellipse, it also contracts radially along the minor axis of the ellipse to maintain a constant thread circumference.

In some embodiments, the circumference of the post thread 140 is uniform throughout both the lead thread section 144 and the locking thread section 146. That is, the circumference of the post thread 140 as defined by the pitch line of the post thread 140 is the same at each axial location along the length of the lead thread section 144 and the length of the locking thread section 146.

In some embodiments, the maximum pitch diameter DPE is at least 7 percent greater than the pitch diameter DPT at the same axial location (i.e., the maximum pitch diameter DPE and the pitch diameter DPT in the same transverse cross-sectional plane; in the illustrated embodiment, at the end 142B) and, in some embodiments, is in the range of from about 7 to 20 percent greater.

According to some embodiments, the axial length L2 (FIG. 7) of the locking thread section 146 is at least 3 mm and, in some embodiments, is in the range of from about 3 mm to 10 mm. According to some embodiments, the locking thread section 146 includes at least 3 thread turns and, in some embodiments, in the range of from about 3 to 10 thread turns.

The post 112 and the post thread 140 may be formed of any suitable material. In some embodiments, the post 112 and the thread 140 are formed of a polymeric material. In some embodiments, the post 112 and the thread 140 are molded (e.g., injection molded). In some embodiments, the post 112 and the thread 140 are monolithic.

The nut thread 150 has a second (central) thread axis C-C. The nut thread 150 extends axially from a leading end 152A to a trailing end 152B.

Figure 5:
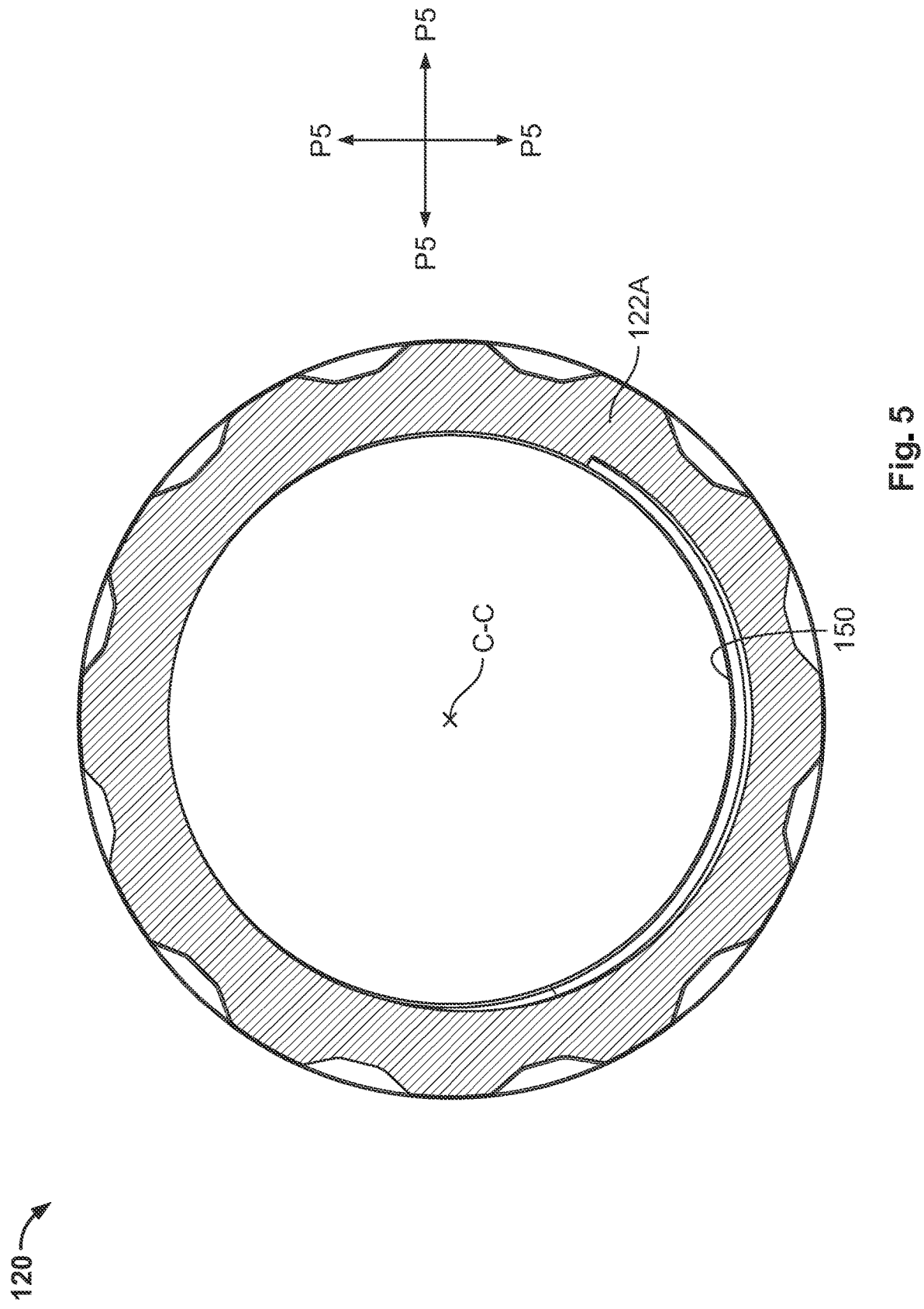
FIG. 5 is a cross-sectional view of the retention nut of FIG. 4 taken along the line 5-5 of FIG. 4.
Figure 6:
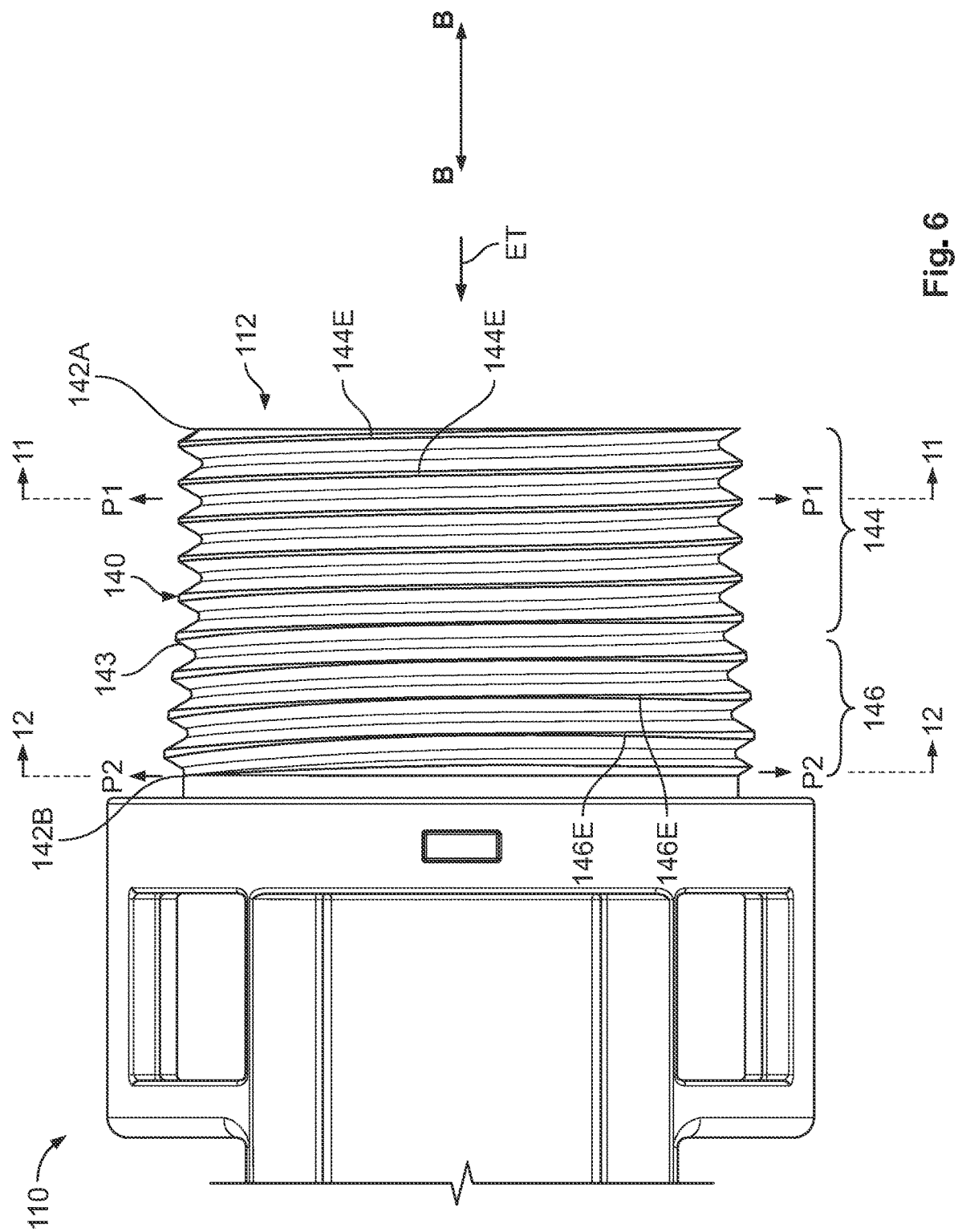
FIG. 6 is a fragmentary, side view of a connector housing forming a part of the terminated cable of FIG. 1.
Figure 7:
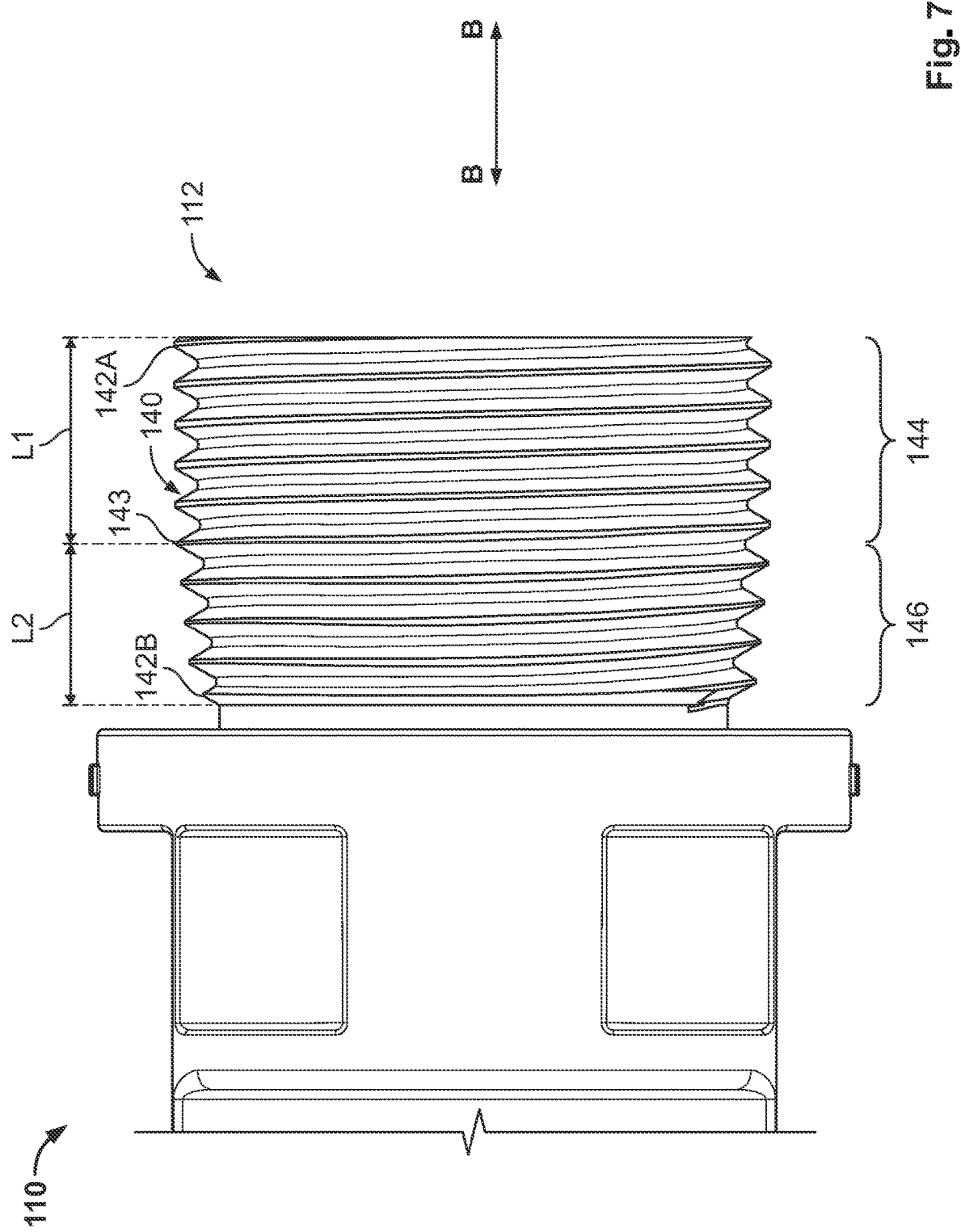
FIG. 7 is a fragmentary, side view of the connector housing of FIG. 6 rotated 90 degrees from the view of FIG. 6 about an axis B-B.

The nut thread 150 (FIGS. 4 and 5) is substantially right circular cylindrical in shape. Accordingly, and as shown in FIG. 5, the nut thread 150 has a circular shape or profile in a transverse cross-section plane P5 that is perpendicular to the thread axis C-C. The pitch diameter DPN (spanning the pitch lines PN) is therefore substantially uniform from end 152A to end 152B. The pitch diameter DPN is substantially the same as or slightly less than the pitch diameter DPL of the lead thread section 144.

According to some embodiments, the axial length L3 (FIG. 4) of the nut thread 150 is at least 8 mm and, in some embodiments, is in the range of from about 8 mm to 15 mm. According to some embodiments, the nut thread 150 includes at least 8 thread turns and, in some embodiments, in the range of from about 8 to 15 thread turns.

The nut 120 and the nut thread 150 are formed of a flexible, resilient material. The nut 120 and the thread 150 may be formed of any suitable flexible, resilient material. In some embodiments, the nut 120 and the thread 150 are formed of a polymeric material. Suitable polymeric materials may include PPE, polyamide, or PA+Glass fibers, for example. The nut 120 may be molded. In some embodiments, the nut 120 is injection molded. In some embodiments, the nut 120 is monolithic.

Figure 14:
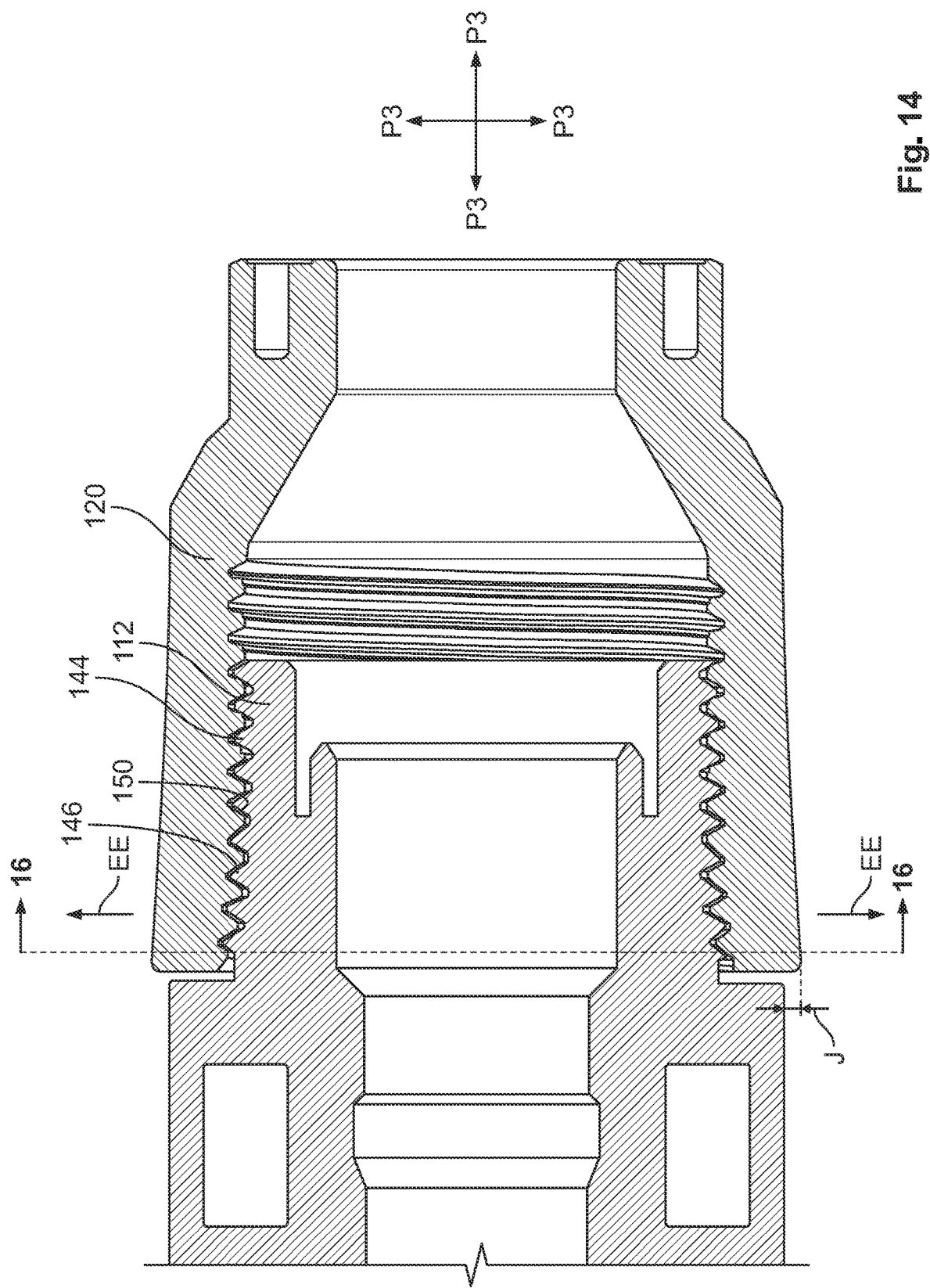
FIG. 14 is a fragmentary, cross-sectional view of the terminated cable of FIG. 1 taken along the line 3-3 of FIG. 1, wherein the retention nut is fully installed on the connector housing.
Figure 15:
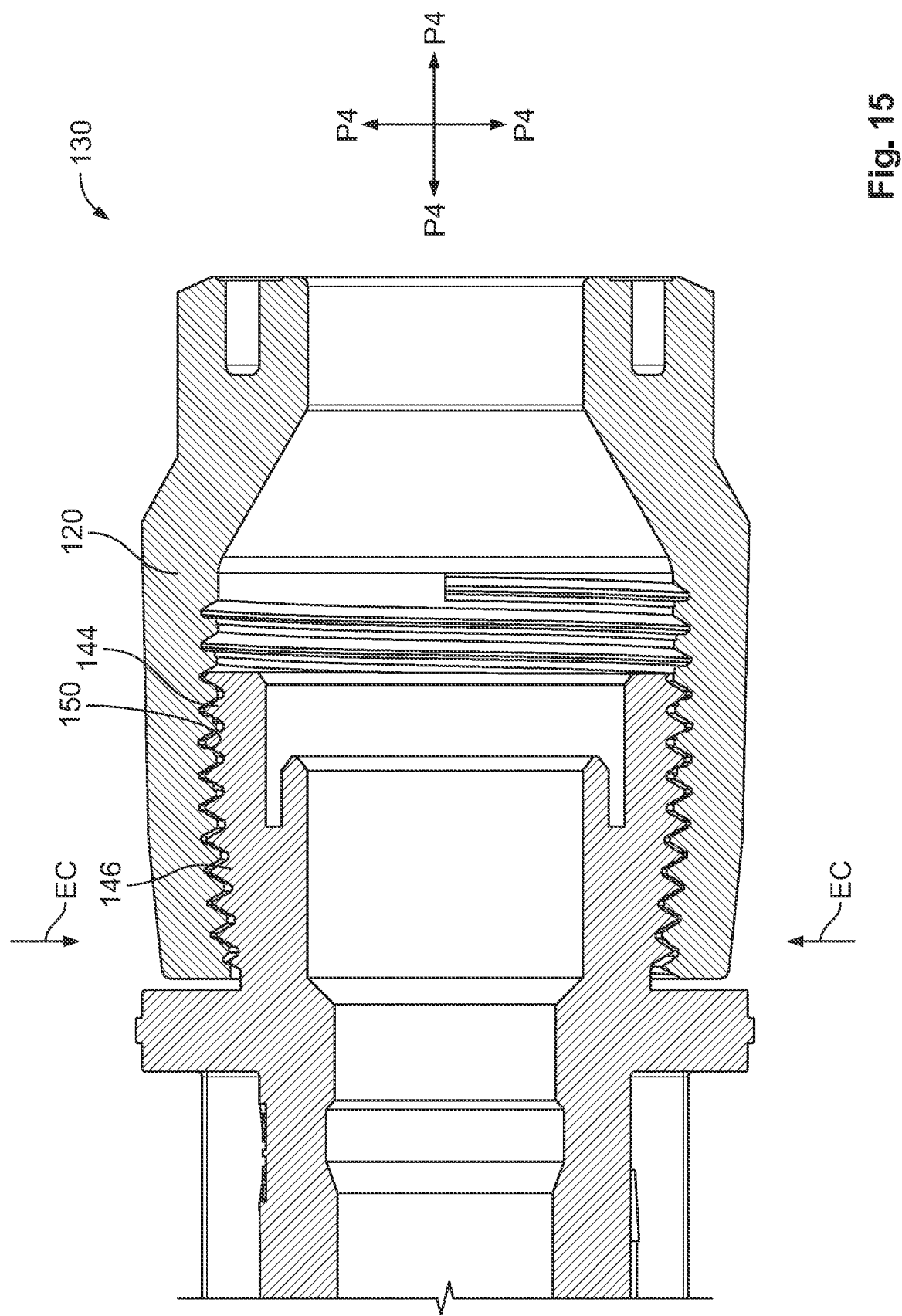
FIG. 15 is a fragmentary, cross-sectional view of the terminated cable of FIG. 1 taken along the line 9-9 of FIG. 1, wherein the retention nut is fully installed on the connector housing.
Figure 16:
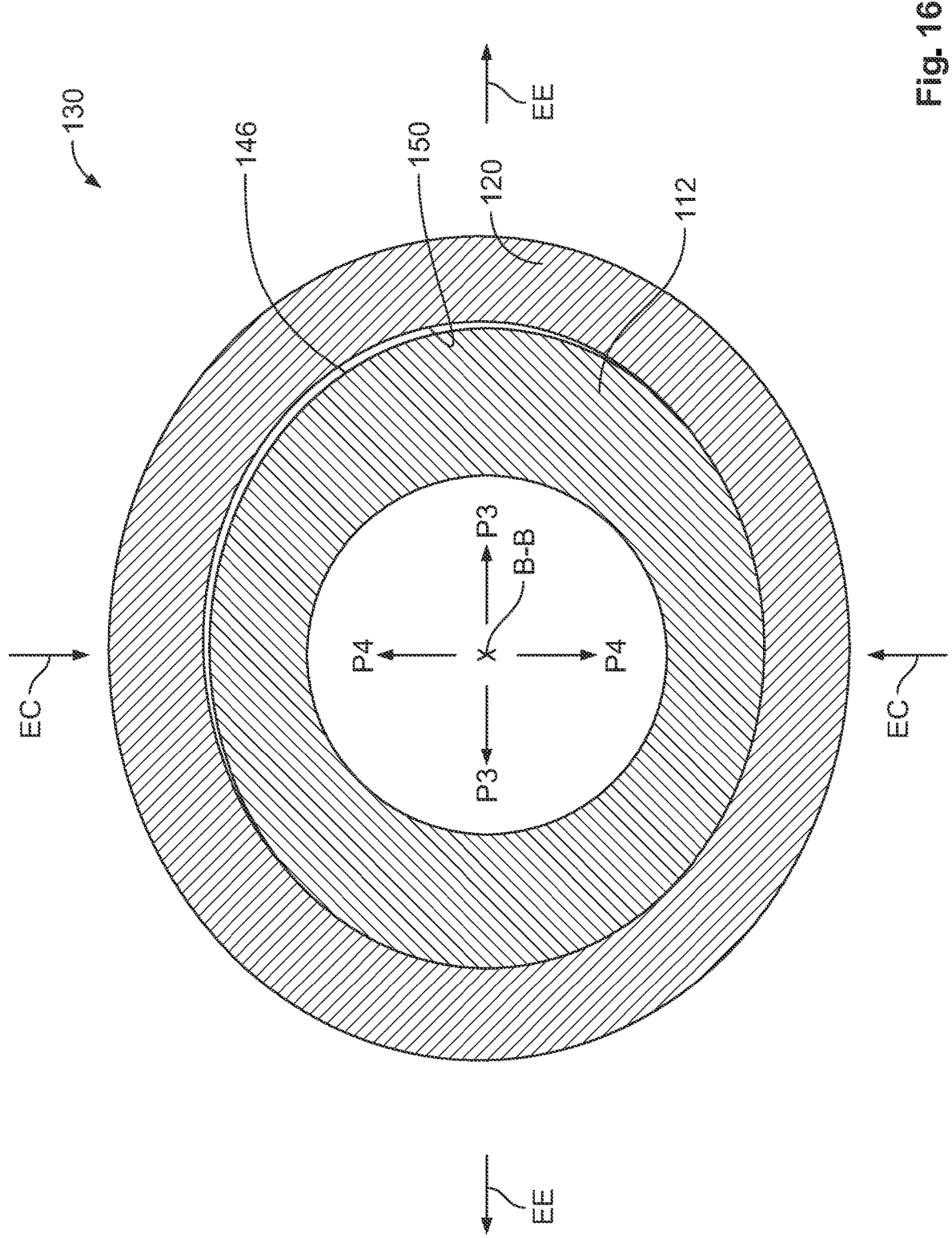
FIG. 16 is a fragmentary, cross-sectional view of the terminated cable of FIG. 1 taken along the line 16-16 of FIG. 14.

According to some embodiments, the nut 120 and the thread 150 are formed of a polymeric material capable of deforming to the extent described herein to assume the fully locked position (e.g., as shown in FIGS. 14-16) without exceeding the elastic deformation region for the material.

The self-locking thread system 130 and the electrical connector 100 may be used and assembled as follows according to some embodiments. The grommet 116 and the pinch ring 118 are slid over the cable 20. The electrical contact 114 is crimped onto or otherwise coupled to the cable conductor 22. The cable 22 and contact 114 assembly are inserted through the rear opening 110C. The retention nut 120 is then threaded onto the post 112. The translating nut 120 drives the fingers 118A of the pinch ring 118 radially inward to bear against or into the cable insulation 24 and to compress the grommet 116. As described in more detail below, the retention nut 120 is threaded onto the post 112 until the locking mechanism 132 locks the nut 120 in a desired position along the post 112.

Figure 13:
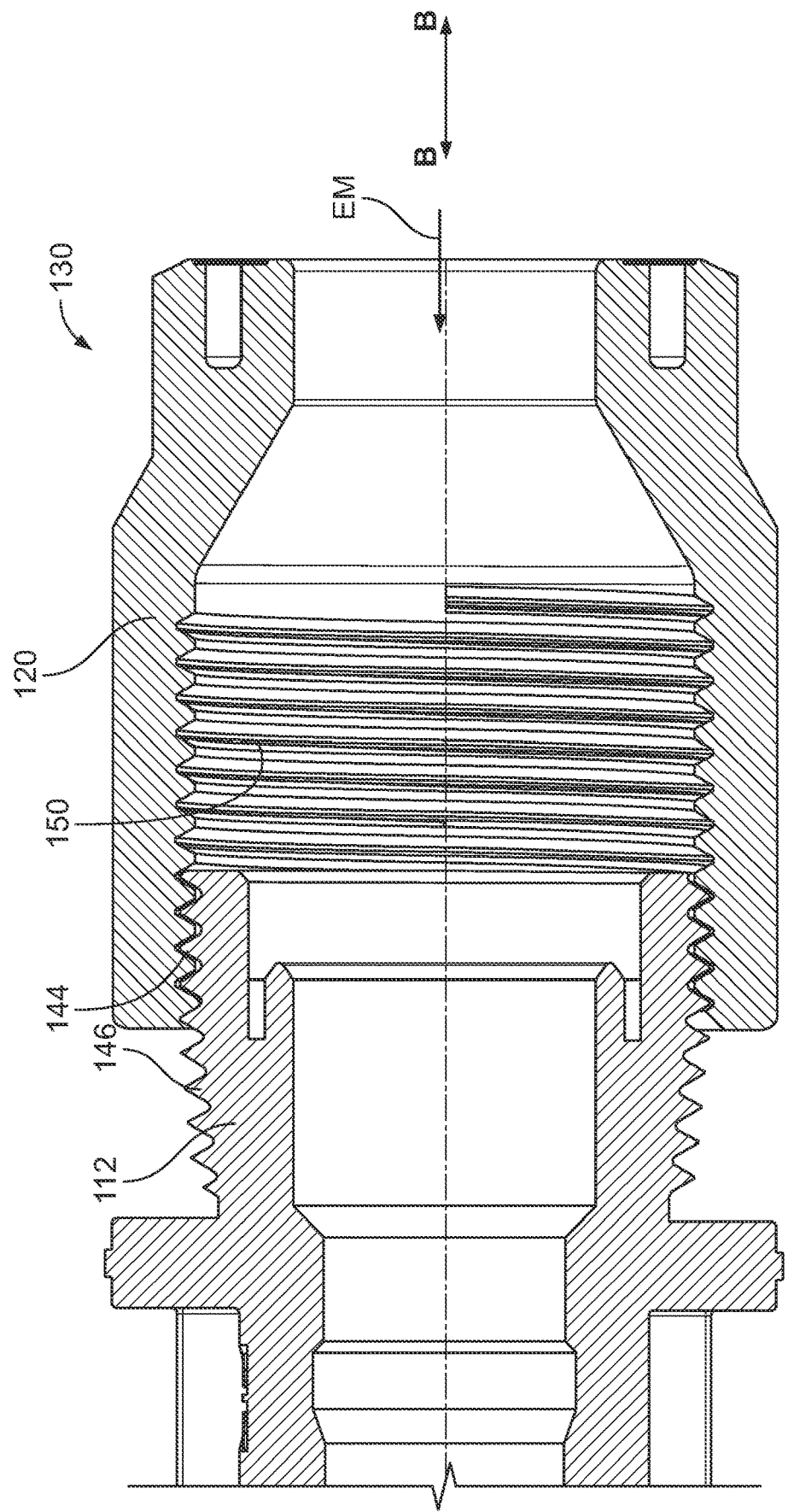
FIG. 13 is a fragmentary, cross-sectional view of the terminated cable of FIG. 1, wherein the retention nut is partially installed on the connector housing.

To mount the retention nut 120 on the post 112, the nut 120 is rotated in direction R (FIG. 2) and thereby threaded onto the post 112 through the front end 152A. More particularly, the nut thread 150 is threaded onto the lead thread section 144 as shown in FIG. 13 and translates in mounting direction EM. Because the nut thread 150 and the lead thread section 144 are both circular and have substantially the same diameter, the nut 120 retains its initial shape and is not deformed. The nut 120 can be threaded up to the transition end 143 with relatively little torque applied.

The nut 120 is then further rotated to thread the nut thread 150 onto the locking thread section 146 as shown in FIGS. 3 and 14-16. As the nut thread 150 travels up the locking thread section 146, the pitch diameter DPE increasingly exceeds the initial (relaxed) pitch diameter DPN of the nut thread 150. The ramping of the locking thread section 146 in the plane P3 forces the sidewall 122A of the nut 120 to expand, bend, deflect or deform in radially outward directions EE as shown in FIGS. 14 and 16. At the same time and axial locations, the tapering of the of the locking thread section 146 in the plane P4 permits the sidewall 122A of the nut 120 to contract, bend, deflect or deform in radially inward directions EC as shown in FIGS. 15 and 16. The nut 120 and the nut thread 150 thereby substantially conform to the shape of the locking thread section 146 and assume a non-circular cross-sectional shape corresponding to the non-circular cross-sectional shape of the locking thread section 146. As discussed above, the non-circular cross-sectional shape of the locking thread section 146, and thus also that of the nut thread 150, may be oblong, non-circular oval, or elliptical.

In some embodiments, when the nut 120 is fully installed on the post 112, the nut sidewall 122A is radially outwardly deflected a distance J (FIG. 14) from its relaxed position of at least 0.5 mm, in some embodiments, in the range of from about 0.5 mm to 2.5 mm and, in some embodiments, at least 1 mm.

The deformation of the nut 120 is elastic and the return force manifests as a clamping force between the nut thread 150 and the locking thread section 146. As a result, the nut deformation creates a locking effect with increased thread-to-thread friction that resists rotation of the nut 120 in either direction relative to the post 112.

As discussed, according to some embodiments the circumference of the locking thread section 146 is uniform and is the same as the circumference of the lead thread section 144 and the circumference of the nut thread 150. Therefore, the nut 120 is deformed but it is not stretched to a larger circumference. In this manner, the amount of torque required to install the nut 150 and the amount of deformation of the nut 120 can be controlled and the stresses on the nut 150 are limited.

The locking effect is applied continuously, which enables the nut 120 to be secured at any position within a range, rather than only at discrete intervals. The locking effect prevents the nut 120 from rotating in either direction. This can prevent the nut 120 from becoming loose.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A self-locking thread system comprising:
a first threaded member including a first thread; and
a second threaded member including a second thread configured to be threaded with the first thread;
wherein:
the first thread has a first thread axis; and
the first thread includes a locking thread section that is non-circular in a transverse cross-sectional plane perpendicular to the first thread axis;
the locking thread section is oval in the transverse cross-sectional plane perpendicular to the first thread axis;
the first thread has a leading end and an opposing trailing end;
a first pitch diameter of the locking thread section expands outwardly in a direction from the leading end to the trailing end in a first axial cross-sectional plane parallel to the first thread axis;
a second pitch diameter of the locking thread section tapers inwardly in the direction from the leading end to the trailing end in a second axial cross-sectional plane parallel to the first thread axis and perpendicular to the first axial cross-sectional plane; and
the second threaded member is formed of a deformable polymer.

2. The self-locking thread system of claim 1 wherein the locking thread section is elliptical in the transverse cross-sectional plane perpendicular to the first thread axis.

3. The self-locking thread system of claim 1 wherein the second pitch diameter of the locking thread section tapers inwardly in the direction from the leading end to the trailing end at an angle of at least 3 degrees.

4. The self-locking thread system of claim 1 wherein the maximum first pitch diameter is at least 7 percent greater than the second pitch diameter at the same axial location.

5. The self-locking thread system of claim 1 wherein the circumference of the locking thread section is substantially uniform.

6. The self-locking thread system of claim 5 wherein:
the first thread further includes a lead thread section that is substantially circular cylindrical; and
the circumference of the lead thread section is substantially the same as the circumference of the locking thread section.

7. The self-locking thread system of claim 1 wherein the first thread further includes a lead thread section that is substantially circular cylindrical.

8. The self-locking thread system of claim 1 wherein the first thread is a continuous helical thread.

9. The self-locking thread system of claim 1 wherein the locking thread section includes at least 3 thread turns.

10. The self-locking thread system of claim 1 wherein the second thread is substantially circular cylindrical.

11. The self-locking thread system of claim 1 wherein:
the first thread is an external thread; and
the second thread is an internal thread.

12. The self-locking thread system of claim 1 wherein:
the first threaded member is a connector housing; and
the second threaded member is a cable retention nut.

13. An electrical connector comprising:
a connector housing including a first thread;
an electrical contact in the connector housing; and
a cable retention nut including a second thread configured to be threaded with the first thread;
wherein:
the first thread has a first thread axis; and
the first thread includes a locking thread section that is non-circular in a transverse cross-sectional plane perpendicular to the first thread axis;
the locking thread section is oval in the transverse cross-sectional plane perpendicular to the first thread axis;
the first thread has a leading end and an opposing trailing end;
a first pitch diameter of the locking thread section expands outwardly in a direction from the leading end to the trailing end in a first axial cross-sectional plane parallel to the first thread axis;
a second pitch diameter of the locking thread section tapers inwardly in the direction from the leading end to the trailing end in a second axial cross-sectional plane parallel to the first thread axis and perpendicular to the first axial cross-sectional plane; and
the cable retention nut is formed of a deformable polymer.

14. The electrical connector of claim 13 wherein the cable retention nut is operable to secure a cable to the connector housing.

15. The electrical connector of claim 13 wherein the circumference of the locking thread section is substantially uniform.

16. The electrical connector of claim 15 wherein:
the first thread further includes a lead thread section that is substantially circular cylindrical; and
the circumference of the lead thread section is substantially the same as the circumference of the locking thread section.

* * * * *